(12) United States Patent
Hoenderkamp et al.

(10) Patent No.: US 11,951,418 B2
(45) Date of Patent: Apr. 9, 2024

(54) REMOVAL DEVICE WITH FLOW CONTROL

(71) Applicant: Flamco B.V., Bunschoten (NL)

(72) Inventors: Erik Johannes Hoenderkamp, Utrecht (NL); Herman Reezigt, Nunspeet (NL)

(73) Assignee: Flamco B.V., Bunschoten (NL)

(*) Notice: Subject to any disclaimer, the term of this patent is extended or adjusted under 35 U.S.C. 154(b) by 626 days.

(21) Appl. No.: 17/041,505

(22) PCT Filed: Mar. 29, 2019

(86) PCT No.: PCT/NL2019/050198
§ 371 (c)(1),
(2) Date: Sep. 25, 2020

(87) PCT Pub. No.: WO2019/190326
PCT Pub. Date: Oct. 3, 2019

(65) Prior Publication Data
US 2021/0008466 A1 Jan. 14, 2021

(30) Foreign Application Priority Data
Mar. 29, 2018 (NL) ...................................... 2020690

(51) Int. Cl.
*B01D 19/00* (2006.01)
*B01D 21/00* (2006.01)
(Continued)

(52) U.S. Cl.
CPC ..... *B01D 19/0042* (2013.01); *B01D 21/0009* (2013.01); *B03C 1/288* (2013.01);
(Continued)

(58) Field of Classification Search
CPC ............ B01D 19/0042; B01D 21/0009; B03C 1/288; B03C 2201/18; B03C 2201/20; F24D 19/0092; F24D 19/083
See application file for complete search history.

(56) References Cited

U.S. PATENT DOCUMENTS 1,062,236 A * 5/1913 Hitchcock .............. B01D 17/00
137/550
2,845,948 A * 8/1958 Parker ................... F16K 11/078
137/625.41

(Continued)

FOREIGN PATENT DOCUMENTS

EP 2 426 423 A2 3/2012
GB 2509714 A 7/2014
(Continued)

*Primary Examiner* — Christopher P Jones
*Assistant Examiner* — Phillip Y Shao
(74) *Attorney, Agent, or Firm* — Hoffmann & Baron, LLP

(57) ABSTRACT

A removal device for removing gas bubbles and/or dirt particles from a liquid in a liquid conduit system includes a main channel for a main flow, the main channel having an entry and an exit which are configured to be connected to the conduit system; a housing which defines an inner space; at least one supply channel extending from the main channel to the inner space; at least one return channel extending from the inner space back to the main channel; and a branch flow control member positioned in the main channel. The branch flow control member being movable between a first position to branch off at least a part of the incoming main flow into the inner space via the supply channel and a second position to branch off at least a part of the incoming main flow into the inner space via the supply channel.

18 Claims, 12 Drawing Sheets

(51) Int. Cl.
 *B03C 1/28* (2006.01)
 *F24D 19/00* (2006.01)
 *F24D 19/08* (2006.01)

(52) U.S. Cl.
 CPC ....... *F24D 19/0092* (2013.01); *F24D 19/083* (2013.01); *B03C 2201/18* (2013.01); *B03C 2201/20* (2013.01)

(56) References Cited

U.S. PATENT DOCUMENTS

| | | | | | |
|---|---|---|---|---|---|
| 3,283,354 | A | * | 11/1966 | Simmons | F16K 11/08 15/104.062 |
| 3,907,688 | A | * | 9/1975 | Close | B01D 35/043 210/444 |
| 3,935,106 | A | * | 1/1976 | Lipner | B01D 35/043 210/418 |
| 3,982,520 | A | * | 9/1976 | Wheeler | B01D 35/306 184/6.24 |
| 4,105,555 | A | * | 8/1978 | Pease | B01D 24/14 137/599.08 |
| 4,379,053 | A | * | 4/1983 | Brane | B01D 35/147 210/419 |
| 4,529,515 | A | * | 7/1985 | Selz | B01D 35/14 210/420 |
| 4,731,183 | A | * | 3/1988 | Schumacher, II | B01D 35/153 210/419 |
| 4,933,080 | A | * | 6/1990 | Rundzaitis | B01D 35/043 4/615 |
| 5,107,896 | A | * | 4/1992 | Otto | F16K 11/085 210/418 |
| 5,445,187 | A | * | 8/1995 | Farquhar | F16K 11/0873 137/182 |
| 6,347,644 | B1 | * | 2/2002 | Channell | F16K 11/20 137/625.29 |
| 7,261,117 | B2 | * | 8/2007 | Mork | F16K 11/0743 137/625.41 |
| 7,815,054 | B2 | * | 10/2010 | Klein | B01D 35/30 210/418 |
| 7,849,877 | B2 | * | 12/2010 | Tan | F16K 11/076 251/285 |
| 8,888,998 | B2 | * | 11/2014 | Swain | B01D 35/147 210/90 |
| 9,149,740 | B2 | * | 10/2015 | Downie | B01D 21/2483 |
| 9,332,969 | B2 | * | 5/2016 | Han | A61B 10/0096 |
| 2007/0144953 | A1 | * | 6/2007 | Rivi | F16K 11/085 210/424 |
| 2019/0106333 | A1 | * | 4/2019 | Campbell | B01D 35/306 |

FOREIGN PATENT DOCUMENTS

| | | | |
|---|---|---|---|
| NL | 2009588 C | 4/2014 | |
| RU | 2013 129 853 A | 1/2015 | |
| WO | 92/02766 A1 | 2/1992 | |
| WO | WO-9604062 A1 * | 2/1996 | ............ B01D 29/23 |
| WO | 00/27499 A1 | 5/2000 | |
| WO | 00/72939 A1 | 12/2000 | |

\* cited by examiner

REMOVAL DEVICE WITH FLOW CONTROL

CROSS-REFERENCE TO RELATED APPLICATIONS

This application is the National Stage of International Application No. PCT/NL2019/050198, filed Mar. 29, 2019, which claims the benefit of Netherlands Application No. 2020690, filed Mar. 29, 2018, the contents of which is incorporated by reference herein.

FIELD OF THE INVENTION

The present invention relates to removal devices for removing dirt particles and/or gas bubbles from a liquid in a liquid conduit system.

BACKGROUND OF THE INVENTION

Many conduit systems in which a liquid is conveyed have problems with dirt particles or gas bubbles in the liquid. This is in particular the case with closed circuits, wherein a liquid may be circulated for a long time period. Such systems are for instance used for heating purposes. Over time, gas bubbles or dirt particles may contaminate the liquid and may deteriorate the functioning of the closed circuit, for instance because the system becomes clogged, or because valves do not function very well. It is also possible that gas bubbles accumulate in certain parts of the closed circuit, leading to dead branches, i.e. to parts of the closed circuit where the flow is obstructed. Cavitation due to gas bubbles causes damage to pumps and valves, in addition to noise for the user.

Over time, different devices have been developed for removing gas bubbles and/or dirt particles. Usually, before connecting such removal devices to a liquid conduit system, the liquid in said conduit system has a relatively high contamination level, wherein in particular a relatively high number of larger dirt particles and/or gas bubbles are present in the system. The dirt particles may comprise magnetite particles, said magnetite being particularly damaging to a pump which provides the circulation of the liquid in the conduit system. It is therefore desired to remove these magnetite particles as soon as possible from the liquid conduit system. It is also desired to circulate the liquid through the liquid conduit system using little energy, as this benefits the life cycle of the pump and reduces the costs of power consumption.

SUMMARY OF THE INVENTION

In a first aspect, the invention has as objective to provide a removal device which provides a more effective and/or more efficient way of removing gas bubbles and/or dirt particles from a liquid in a liquid conduit. This objective is achieved by a removal device for removing gas bubbles and/or dirt particles from a liquid in a liquid conduit, the removal device comprising:
  a main channel for a main flow, the main channel having an entry and an exit which are configured to be connected to the conduit system,
  a housing which defines an inner space, wherein the housing is arranged adjacent the main channel,
  at least one supply channel extending from the main channel to the inner space,
  at least one return channel extending from the inner space back to the main channel,
  a branch flow control member positioned in the main channel, the branch flow control member being movable between a first position in which the branch flow control member is constructed to branch off at least a part of the incoming main flow into the inner space via the supply channel and a second position in which the branch flow control member is constructed to branch off at least a part of the incoming main flow into the inner space via the supply channel, wherein in the first position the branch flow control member is constructed to branch off a larger part of the incoming main flow into the inner space via the supply channel than in the second position.

An advantage of the removal device is that the branch flow control member provides flexibility with respect to the part of the incoming main flow that is branched off. In the first position, a larger part is branched off, which may result in a quicker removal of dirt particles, in particular larger dirt particles. The first position may be advantageous when the removal device has just been installed, and there are a relatively high number of larger dirt particles and gas bubbles present in the liquid conduit system. The first position allows these larger dirt particles and gas bubbles to be removed faster, as a larger part of the incoming main flow is branched off into the inner space, where said particles and bubbles may be removed. In the first position the removal device therefore may nearly function as if it were a single-pass removal device, i.e. wherein the liquid only has to be circulated once through the removal device in order to remove the contaminations.

Another advantage is that when in the second position, a smaller part of the incoming main flow is branched off into the inner space, so a higher part of the incoming main flow will flow substantially unhindered through the main channel when compared to the first position. The second position resembles an ECO-mode, wherein it requires less power to circulate the liquid through the system compared to the first position.

Therefore the branch flow control member allows the removal device to remove the larger dirt particles and gas bubbles in the initial time period. After this initial time period, it is desired to continue the operation with the least amount of resistance during normal operational use. This is achieved when the branch flow control member is in the second position, wherein smaller particles and bubbles have more time to settle down, respectively ascend.

In an embodiment of the removal device, the branch flow control member is configured to gradually decrease the part of the incoming main flow which is branched off when the branch flow control member moves from the first position to the second position, and to gradually increase the part of the incoming main flow which is branched off when the branch flow control member moves from the second position to the first position.

An advantage of the gradual increase and decrease is that the branch flow control member has multiple positions which may be obtained, resulting in an even more flexible removal device.

In an embodiment of the removal device, the first position the branch flow control member is constructed to branch off substantially 100% of the incoming main flow into the inner space.

Branching off substantially 100% of the incoming main flow has the advantage that a high removal rate may be achieved.

In an embodiment of the removal device, in the second position the branch flow control member is constructed to branch off 10-30% of the incoming flow into the inner space.

An advantage of only branching off 10-30% of the incoming main flow into the inner space is that the flow velocity inside the inner space will be relatively low, which allows dirt particles to settle, and gas bubbles to rise inside the inner space. This branch off percentage was found to provide the best results when the branch flow control member is in the second position.

In another embodiment of the removal device, in the second position the branch flow control member is constructed to branch off 30-70%, in particular 40-60%, more in particular substantially 50% of the incoming flow into the inner space.

Branching off 30-70%, in particular 40-60%, more in particular substantially 50% of the incoming flow into the inner space has the advantage that still a high removal rate may be achieved while requiring less power to circulate the liquid through the liquid conduit system.

This embodiment may alternatively be provided with the previous embodiment, such that the removal device comprises a first position, a second position and a third position. In the second position the branch flow control member branches off 10-30%, and in the third position the branch flow control member branches off 30-70%. This way substantially three modes are provided. A first mode in which the largest part of the incoming main flow is branched off, having as advantage a highest removal rate. A second mode in which the removal rate is still relatively high, but the power consumption is relatively low. And a third mode in which the removal rate is the lowest of the three modes, but wherein the power consumption is also the lowest of the three modes.

In an embodiment of the removal device, the branch flow control member comprises the supply channel and the return channel.

In an embodiment of the removal device, the main channel is straight, and wherein in the second position the branch flow control member is constructed to allow a part of the incoming main flow to flow straight through the main channel without being branched off.

Allowing a part of the incoming main flow to flow straight has the advantage that there is less resistance, so a low pressure drop. This has the advantage that less power is required to circulate the liquid through the liquid conduit system.

In an embodiment of the removal device, the branch flow control member is pivotable about a pivot axis.

In an embodiment of the removal device, the branch flow control member is movable between the first position and the second position via an adjustment member which is manually operable.

This allows the user to choose between the first and second position, and also other positions between said first and second position.

In an embodiment of the removal device, the housing is connected to the main channel via a pivotable coupling, the pivotable coupling comprising the adjustment member.

An advantage of said embodiment is a compact construction.

In an embodiment, the removal device comprises a cylindrical bore defined by a bore wall, the cylindrical bore having a first central axis extending substantially perpendicular to the direction of the main channel and extending towards the inner space, the cylindrical bore having a bore entry where the main flow enters the bore and a bore exit where the main flow exits the bore, the cylindrical bore having a first length and a first inner diameter, wherein the branch flow control member is positioned inside the bore and is pivotable about the pivot axis, the pivot axis being coaxial with the first central axis of the cylindrical bore.

In an embodiment of the removal device, the branch flow control member comprises a pivotable main channel part defined by a main channel wall, the main channel part being configured to provide a straight flow path for an ongoing part of the main flow between the entry and the exit when the branch flow control member is in the second position, wherein the main channel part extends substantially perpendicular to the pivot axis.

In an embodiment of the removal device, the branch flow control member comprises one or more walls which extend over a distance along the pivot axis and which define at least a first channel part and a second channel part, wherein the first channel part extends from the bore entry to the inner space and defines a supply channel when the branch flow control member is in the first position or the second position and wherein the second channel part extends from the inner space to the bore exit and defines a return channel when the branch flow control member is in the first position or the second position.

In an embodiment of the removal device, the branch flow control member comprises the adjustment member which is configured to pivot the branch flow control member between the first position and the second position when operated by a user.

In an embodiment of the removal device, the main channel part, the first and second channel part are jointly pivoted when the branch flow control member is pivoted about the pivot axis.

Said embodiment provides an efficient removal device, which is user-friendly. The adjustment member further allows easy positioning between the first and second position.

In an embodiment of the removal device, the one or more walls define:
the first channel part,
the second channel,
a third channel part, and
a fourth channel part,
wherein when viewed in the direction of the pivot axis, the first, second, third and fourth channel part are located about the pivot axis and in particular form quadrants about the pivot axis,
wherein in the first position of the branch flow control member the first and third channel parts are positioned at the bore entry and form the supply channel and the second and fourth channel parts are positioned at the bore exit and form the return channel, and wherein in the second position of the branch flow control member the first and fourth channel parts are positioned at the bore entry and form the supply channel and the second and third channel parts are positioned at the bore exit and form the return channel.

This way, the removal device always provides a supply channel and a return channel, thereby allowing the liquid to flow through the removal device from the entry to the exit.

In an embodiment of the removal device, the branch flow control member is symmetrical with respect to at least one plane extending along the pivot axis, in particular with respect to two planes extending along the pivot axis.

Such symmetry is advantageous with respect to pressure differences in the branch flow control member. The identical dimensions inherent to symmetry prevent these pressure differences.

The symmetry is also advantageous with respect to the pivot direction. Due to the symmetry, the branch flow control member may be pivoted either clockwise or counterclockwise from the first position to the second position, and vice versa.

In an embodiment of the removal device, the branch flow control member comprises a central body extending over a distance along the pivot axis, wherein the main channel part extends through said central body, wherein the first, second, third and fourth channel parts are defined by a first, second, third and fourth wall which extend over a radial distance from the central body and extend over a distance along the pivot axis, wherein the first, second, third and fourth channel parts are located around said central body, wherein in particular each of the first, second, third and fourth channel parts having a cross section in the form of a pie-shape or a shape of one quarter of an annulus. Said embodiment provides a simple construction.

In an embodiment of the removal device, the adjustment member is located at the pivotable coupling, in particular located between an end of the cylindrical bore, and an end of the housing, wherein the housing is pivotable relative to the bore wall which defines the cylindrical bore, and the adjustment member is pivotable relative to both the bore wall which defines the cylindrical bore and to the end of the housing.

The pivotable coupling allows the housing to be positioned in a desired orientation regardless of the orientation of the orientation of the main channel. It may be that the main channel has to be connected to a conduit which has an inclined orientation. In such a case, the housing is pivoted with respect to the main channel and conduit such that the housing has its desired orientation. This will generally be a substantially vertical orientation.

In an embodiment of the removal device, the first channel part and the second channel part extend substantially parallel to the pivot axis, and are separated from one another by the one more walls.

In an embodiment of the removal device, the branch flow control member comprises four separating walls extending radially away from and parallel to the pivot axis, wherein the four separating walls define the four quadrants.

In an embodiment of the removal device, the branch flow control member is configured to pivot over an angle of 90° between the first position and the second position.

In an embodiment of the removal device, the branch flow control member comprises a valve which is positioned in the main channel, wherein the valve comprises a pivot axis about which valve is pivotable between the first position and the second position by the adjustment member, the pivot axis extending perpendicular to the main flow direction, wherein in the first position, the valve defines at least two supply channels for branching off substantially 100% of the incoming main flow, and one return channel, and wherein in the second position, the valve defines a supply channel, a return channel, and one main channel part, the main channel part being configured to provide a substantially unobstructed straight flow path for a part of the main flow between the entry and the exit.

In an embodiment the removal device comprises a single branch flow control member.

An advantage of having a single branch flow control member, is that a user only has to perform a single action when switching between the first position and the second position.

In an embodiment of the removal device, a hollow member is provided in the inner space, the hollow member extending from a bottom portion of the housing into the inner space, in particular to above the supply channel, wherein an interior magnet is provided inside the hollow member, the interior magnet being removable from the hollow member via an opening.

In an embodiment of the removal device, when the branch flow control member is in the first position, the removal device is configured to remove magnetite particles and dirt particles in a first ratio of magnetite particles to dirt particles which is higher than a second ratio of magnetite particles to dirt particles when the branch flow control member is in the second position.

In an embodiment of the removal device, when the branch flow control member is in the first position, the removal device is configured to form a vortex in the inner space, and when the branch flow control member is in the second position, the removal device is configured to from substantially no vortex in the inner space.

As in the first position a large part of the incoming main flow is branched off into the inner space of the removal device, a vortex will be formed because of the high flow rate into the inner space. In the second position the flow rate into the inner space is lower such that substantially no vortex is formed.

The vortex is characterized by a low liquid velocity near the center, whereby air bubbles can easily rise, and on the other hand a high liquid velocity on the outside, whereby heavier dirt particles are forced outside the outer wall by the centrifugal forces, and are therefore easily removed.

Because of the vortex all magnetite particles are guided within the sphere of influence of the magnet, and pulled towards the magnet. The low fluid velocity in the eye of the vortex promotes the growth of magnetite on the hollow member of the magnet.

The invention further relates to a method of removing gas bubbles and/or dirt particles from a liquid, the method comprising:
  providing a removal device according to the present invention,
  positioning the branch flow control member in the first position,
  guiding a flow of liquid through the removal device,
  positioning the branch flow control member in the second position,
  guiding a flow of liquid through the removal device.

In a second aspect, the invention has as objective to provide a removal device which provides an improved removal of dirt particles and/or gas bubbles from a liquid in a liquid conduit system. This objective is achieved by a removal device comprising:
  a main channel for a main flow, the main channel having an entry and an exit which are configured to be connected to the conduit system,
  a housing which defines an inner space, wherein the housing is arranged adjacent the main channel,
  at least one supply channel extending from the main channel to the inner space,
  at least one return channel extending from the inner space back to the main channel,
  a first curved wall and a second curved wall provided in the inner space and located at a distance from the housing wall, wherein the first curved wall and the second curved wall define a central zone between them, wherein a settling zone entry channel is defined between the first curved wall and the housing wall, and wherein a settling zone return channel is defined between the second curved wall and the housing wall, wherein the first curved wall has a leading edge which is directed against the incoming supply flow which enters the inner space via the supply channel, the removal device further comprising:
- a lower settling zone located in a lower region of the inner space, wherein in use the liquid has a substantially smaller flow velocity in the lower settling zone than in the main channel, the lower settling zone being configured for settling of dirt particles, the removal device comprising a dirt discharge exit for discharging the settled dirt particles, wherein the dirt discharge exit is located at a lower end of the housing, and/or
- an upper rising zone located in an upper region of the inner space, wherein in use the liquid has a substantially smaller flow velocity in the upper rising zone than in the main channel, the upper rising zone being configured to allow rising of gas bubbles, the removal device comprising a gas discharge exit for discharging the risen gas bubbles, wherein the gas discharge exit is located at an upper end of the housing, wherein the leading edge of the first curved wall is configured to divide the incoming supply flow in:
- a central flow which flows into the central zone, and
- a settling zone entry flow which flows into and through the settling zone entry channel and from the settling zone entry channel into the lower and/or upper rising zone, wherein the settling zone return channel is configured to guide a settling zone return flow from the lower and/or upper rising zone toward the return channel, wherein a merge location is defined between a trailing edge of the second curved wall and the return channel where the central flow from the central zone merges with the settling zone return flow and from which merge location the merged flow flows toward and into the return channel, wherein the central zone has a substantially cylindrical shape.

This second aspect can be regarded independently from the first aspect.

In an embodiment of the removal device, the central zone is configured to act as a central centrifugal zone for removing dirt particles and gas bubbles on the basis of centrifugal action when a flow velocity of the central flow exceeds a threshold value, and wherein the central zone is configured to act as a central settling zone for dirt particles and gas bubbles when a flow velocity of the central flow is below said threshold value.

An advantage of the removal device according to the second aspect of the invention is that two dirt and gas removal principles may be combined, i.e. settling and centrifuge. The cylindrical shaped central zone facilitates the formation of a vortex, forcing dirt particles to the periphery of the vortex while forcing the gas bubbles to the middle, or the eye, of the vortex. Larger dirt particles and gas bubbles will be more prone to the centrifugal forces induced by the vortex, which is advantageous for the removal of those larger particles and bubbles.

The settling zone entry channel provides a path for the settling zone entry flow to slow down, thereby extending a settling path of the dirt particles towards the lower end of the housing. Also a rising path for the gas bubbles toward the upper end of the housing is extended by the settling zone entry channel. This is advantageous for the settling rate of the dirt particles, and for the rising rate of the gas bubbles.

In an embodiment of the removal device, the threshold value is 0.6 m/s.

In an embodiment of the removal device, the first and second curved walls are positioned mirrored relative to a central axis of the inner space.

In an embodiment of the removal device, the settling zone entry channel comprises:
- a settling zone entry channel entrance being defined between the leading edge of the first curved wall and the housing wall, and
- a bottom exit opening which opens into the lower settling zone, the bottom exit opening being defined between a lower end of the first curved wall and the housing wall, and/or an upper exit opening which opens into the upper rising zone, the upper exit opening being defined between an upper end of the first curved wall and the housing wall, and wherein the settling zone return channel comprises:
- a settling zone return channel exit being defined between the trailing edge of the second curved wall and the housing wall, and
- a bottom entrance opening which provides an entrance from the lower settling zone into the settling zone return channel, the bottom entrance opening being defined between a lower end of the second curved wall and the housing wall, and/or an upper entrance opening which provides an entrance from the upper rising zone into the settling zone return channel, the upper entrance opening being defined between an upper end of the second curved wall and the housing wall.

In an embodiment of the removal device, the first and second curved walls have an edge at a side thereof which is located away from the supply channel and return channel, wherein said edge is in contact with the housing wall and closes the settling zone entry channel and the settling zone return channel at the edge.

In an embodiment of the removal device, the first and second curved walls extend substantially parallel to the housing wall, and in particular extend vertically.

In an embodiment, the removal device further comprises an inner top wall and an inner bottom wall, wherein the inner top wall extends between the upper ends of the first and second curved walls, wherein the inner bottom wall extends between the lower ends of the first and second curved walls, wherein the inner top wall and the inner bottom wall define an upper end respectively a lower end of the central zone.

The inner top and inner bottom walls further define the central zone, which has the advantage that the vortex is only induced between the curved walls and the inner top and inner bottom wall. The lower settling zone and the upper rising zone are substantially unaffected by the vortex, thereby providing a quiet settling and rising zone, in turn providing a high settling rate and rising rate. High settling and rising rates are advantageous for dirt and gas removal.

In an embodiment of the removal device, the inner bottom wall comprises a bottom through hole for dirt particles to pass to the lower settling zone located below the central zone, and wherein the inner bottom wall is in particular inclined in order to guide dirt particles toward the bottom through hole, and/or wherein the inner top wall comprises a top through hole for gas bubbles to pass to the upper rising zone located above the central zone and wherein the inner top wall is in particular inclined in order to guide gas bubbles toward the top through hole.

In an embodiment of the removal device, the through holes are provided in a center of the inner bottom wall and/or inner top wall.

The through hole in the center in the inner top wall has the advantage that the gas bubbles which are forced to the center, or the eye, of the vortex, move straight up through the through hole to the upper rising zone.

In an embodiment of the removal device, a hollow member is provided in the inner space, the hollow member extending from a bottom portion of the housing into the inner space, in particular to an upper end of the central zone, wherein an interior magnet is provided inside the hollow member, the interior magnet being removable from the hollow member via an opening.

The magnet attracts magnetite particles, thereby separating the magnetite particles from the liquid in the conduit system. An advantage of the magnet extending into the central zone, is that the central flow immediately encounters said magnet, which allows magnetite particles to immediately attach to the magnet, via the hollow member that is.

In an embodiment of the removal device, the hollow member extends through the bottom through hole, wherein a cross-sectional area of the hollow member is smaller than a cross-sectional area of the bottom through hole, thereby defining a gap between the hollow member and the bottom through hole which allows dirt particles to pass through the gap.

In an embodiment of the removal device, an exterior magnet is provided on an outer surface of the housing, in particular at a location opposite to the supply channel and return channel.

In a third aspect of the invention, the embodiments of the removal devices according to both the first and second aspect may be combined, thereby complementing each other.

In said combined embodiments, when the branch flow control member is in the first position, a flow velocity of the supply flow into the inner space is higher than a flow velocity of the supply flow into the inner space when the branch flow control member is in the second position wherein in the first position the central zone acts as a centrifugal zone and wherein in the second position the central zone acts as a settling zone.

The invention further relates to a method of removing gas bubbles and/or dirt particles from a liquid, the method comprising:
providing a removal device according to the present invention,
guiding a supply flow through the supply channel into the inner space,
dividing the supply flow into a central flow and a settling zone entry flow with the leading edge of the first curved plate,
guiding the settling zone entry flow into the lower settling zone and/or the upper rising zone, and allowing dirt particles to settle in the lower settling zone and/or gas bubbles to rise in the upper rising zone, and
allowing dirt particles to settle and gas bubbles to rise in the central zone.

In an embodiment, the method comprises:
positioning the branch flow control member in the first position, wherein dirt particles and/or gas bubbles are separated from the central flow in the central zone on the basis of centrifugal action, and
positioning the branch flow control member in the second position, wherein dirt particles and/or gas bubbles are separated from the central flow in the central zone on the basis of settling.

BRIEF DESCRIPTION OF THE DRAWINGS

Embodiments of the system and the method will be described by way of example only, with reference to the accompanying schematic drawings in which corresponding reference symbols indicate corresponding parts, and in which.

DETAILED DESCRIPTION OF THE INVENTION

Figure 1:
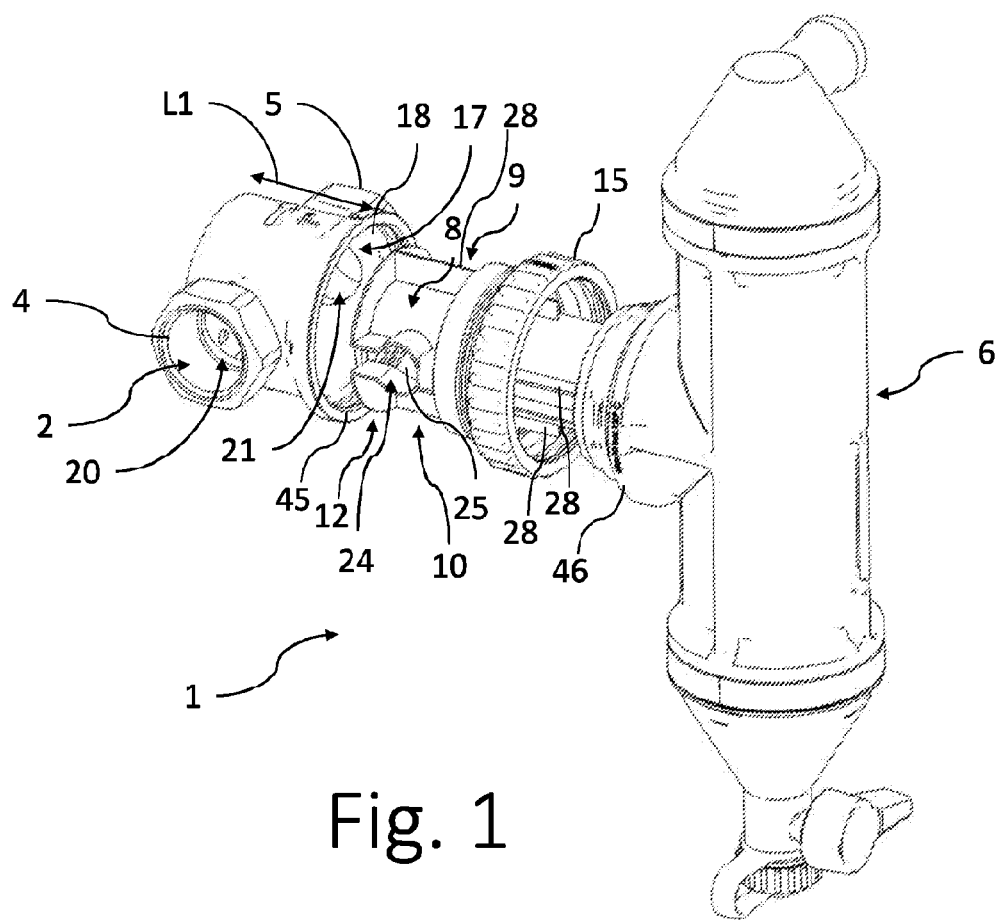
FIG. 1 schematically shows in perspective an exploded view of an embodiment of a removal device according to the first and combined invention.
Figure 2:
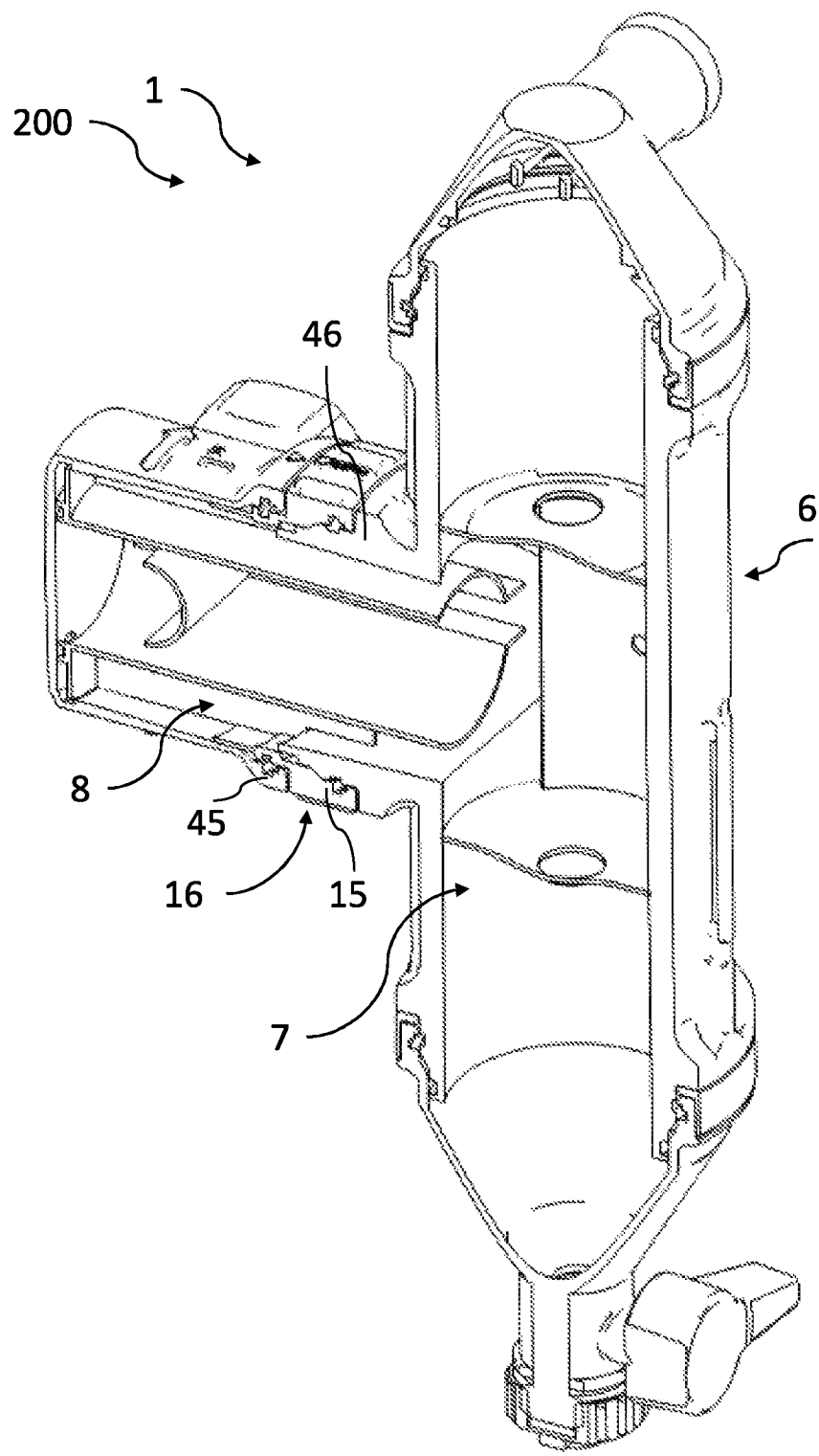
FIG. 2 schematically shows a cross-sectional view of an embodiment of the removal device of FIG. 1.
Figure 3:
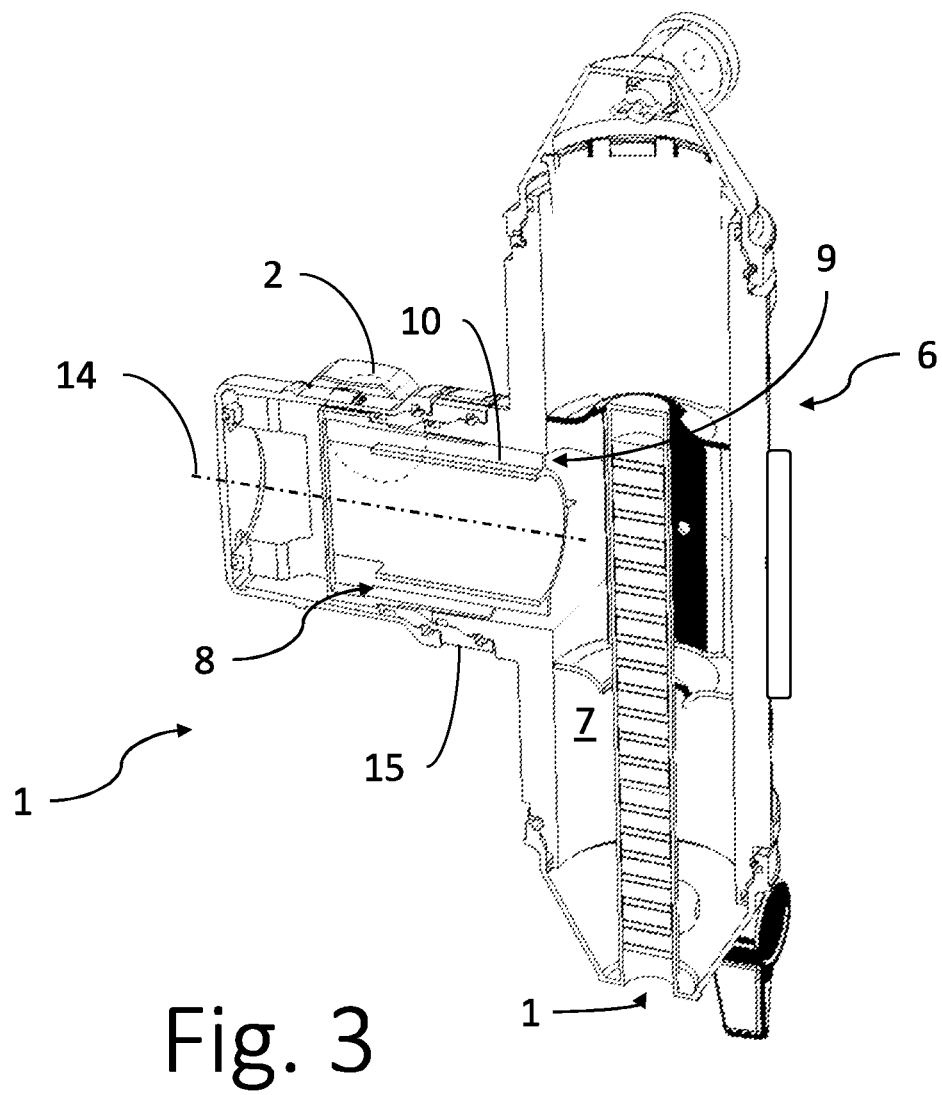
FIG. 3 schematically shows a cross-sectional view of another embodiment of the removal device of FIG. 1.

Turning to FIGS. 1, 2 and 3, a removal device 1 for removing gas bubbles and/or dirt particles from a liquid in a liquid conduit system (not shown) according to the first invention is shown.

Figure 4:
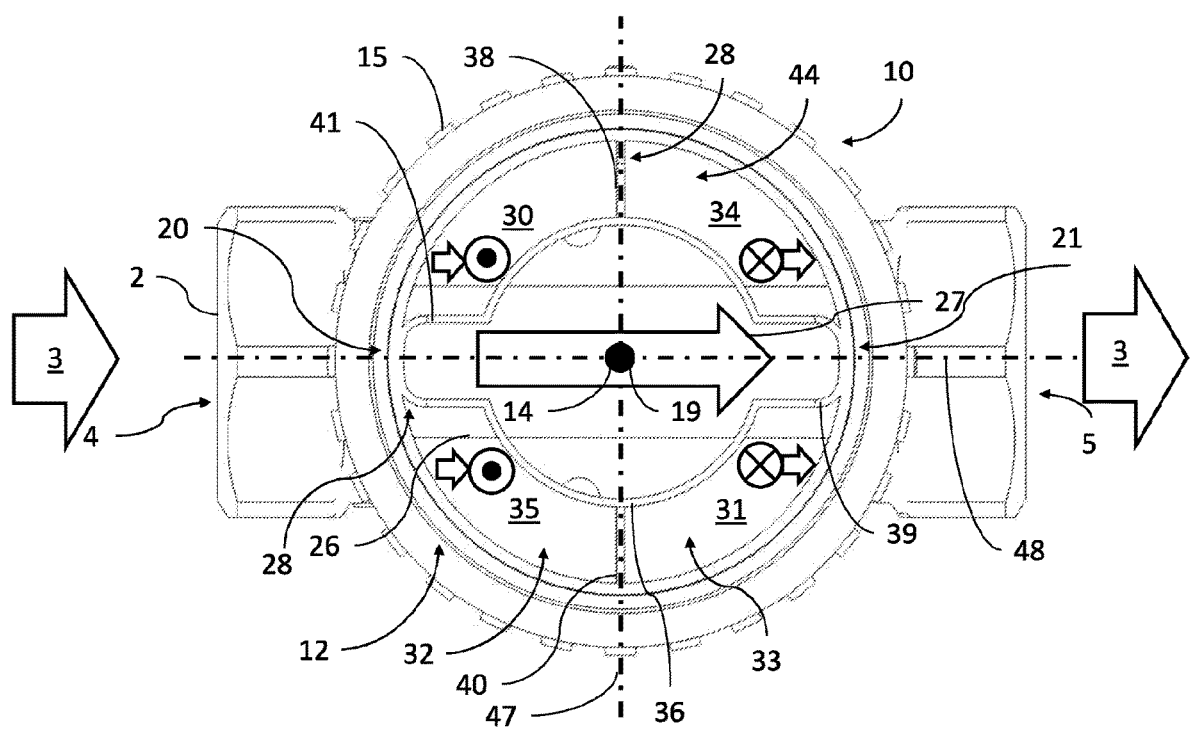
FIG. 4 schematically shows a cross-sectional side view of an embodiment of the removal device according to the first and combined invention, wherein a branch flow control member is in the second position.
Figure 5:
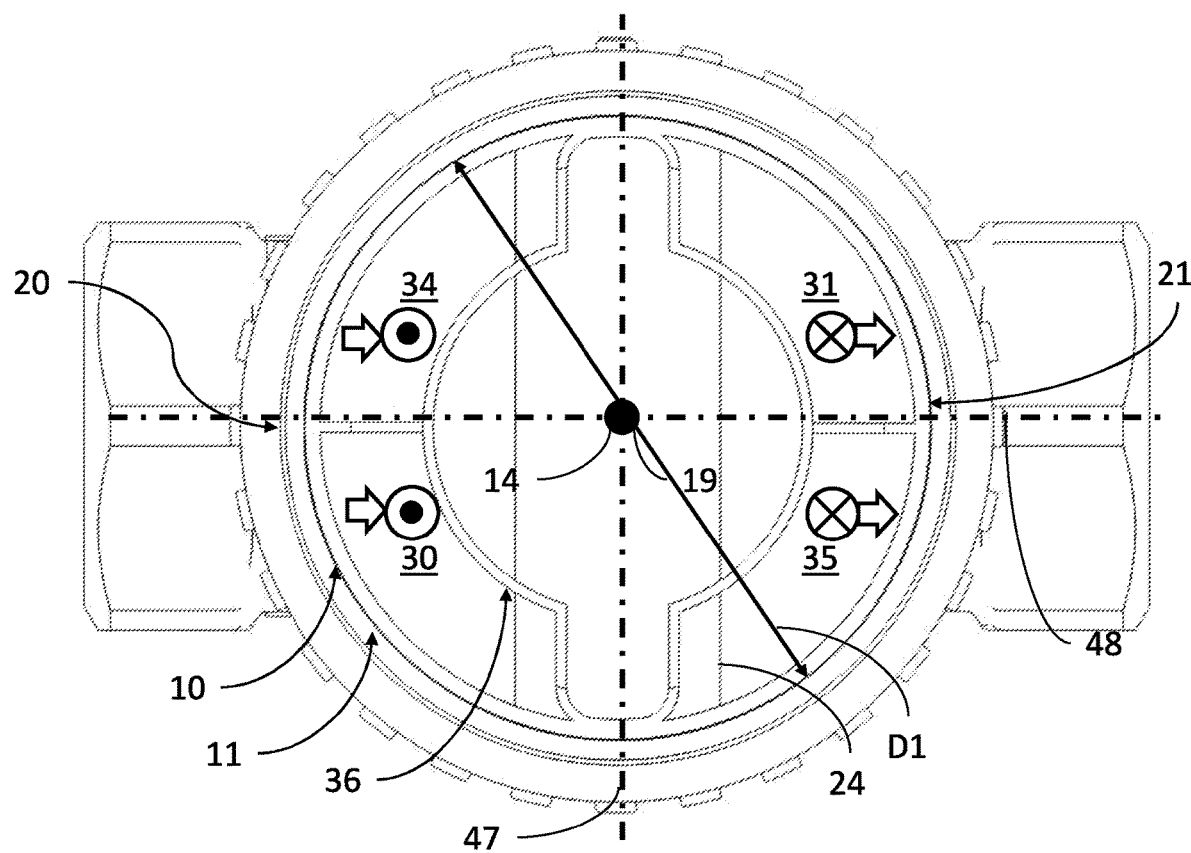
FIG. 5 schematically shows a cross-sectional side view of an embodiment of the removal device according to the first and combined invention, wherein the branch flow control member is in the first position.

The removal device 1 comprises a main channel 2 for a main flow 3 (FIG. 4). The main channel 2 has an entry 4 and an exit 5 which are configured to be connected to the conduit system. A housing 6 defines an inner space 7, which housing 6 is arranged adjacent the main channel 2. At least one supply channel 8 extends from the main channel 2 to the inner space 7. At least one return channel 9 extends from the inner space 7 back to the main channel 2. A branch flow control member 10 is positioned in the main channel 2. Said branch flow control member 10 is movable between a first position 11, as shown in FIGS. 3 and 5, and a second position 12, as shown in FIGS. 1, 2 and 4. In the first position 11 the branch flow control member 10 is constructed to branch off a larger part of the incoming main flow 3 into the inner space 7 via the supply channel 8 than in the second position 12.

The branch flow control member 10 is configured to gradually decrease the part of the incoming main flow 3 which is branched off when the branch flow control member 10 moves from the first position 11 to the second position 12, and to gradually increase the part of the incoming main flow 3 which is branched off when the branch flow control member 10 moves from the second position 12 to the first position 11.

In the first position 11 the branch flow control member 10 branches off substantially 100% of the incoming main flow 3 into the inner space 7.

In the second position 12 the branch flow control member 10 branches off 30-70%, in particular 40-60%, more in particular substantially 50% of the incoming flow into the inner space 7.

The main channel 2 is straight. So the part of the incoming main flow 3 that is not branched off, flows straight from the entry 4 to the exit 5. In the second position 12 the branch flow control member 10 therefore allows a part of the incoming main flow 3 to flow straight through the main channel 2 without being branched off.

The branch flow control member 10 comprises the supply channel 8 and the return channel 9.

The branch flow control member 10 is movable between the first position 11 and the second position 12 via an adjustment member 15 which is manually operable. Moving the branch flow control member 10 may be done by pivoting it about a pivot axis 14. So in fact the adjustment member 15 is pivoted, thereby pivoting the branch flow control member 10.

The removal device 1 comprises a cylindrical bore 17 defined by a bore wall 18. The cylindrical bore 17 has a first central axis 19 (FIG. 4) extending substantially perpendicular to the direction of the main channel 2 and extending towards the inner space 7. The cylindrical bore 17 has a bore entry 20 where the main flow 3 enters the bore 17 and a bore exit 21 where the main flow 3 exits the bore 17. The cylindrical bore 17 has a first length L1 and a first inner diameter D1 (FIG. 5).

The branch flow control member 10 is positioned inside the bore 17 and is pivotable about a pivot axis 14. The pivot axis 14 is coaxial with the first central axis 19 of the cylindrical bore 17.

The housing 6 is connected to the main channel 2 via a pivotable coupling 16. The pivotable coupling 16 comprises the adjustment member 15.

The adjustment member 15 is located at the pivotable coupling 16, in particular located between an end 45 of the cylindrical bore 17, and an end 46 of the housing 6. The housing 6 is pivotable relative to the bore wall 18 which defines the cylindrical bore 17, and the adjustment member 15 is pivotable relative to both the bore wall 18 which defines the cylindrical bore 17 and to the end 45 of the housing 6.

The pivotable coupling 16 allows the housing 6 to be positioned in a desired orientation regardless of the orientation of the orientation of the main channel 2. It may be that the main channel 2 has to be connected to a conduit which has a inclined orientation. In such a case, the housing 6 is pivoted with respect to the main channel 2 and conduit such that the housing 6 has its desired orientation. This will generally be a substantially vertical orientation.

The branch flow control member 10 further comprises a pivotable main channel part 24 defined by a main channel wall 25. The main channel part 24 thus provides a straight flow path 26 for an ongoing part 27 of the main flow 3 between the entry 4 and the exit 5 when the branch flow control member 10 is in the second position 12. The main channel part 24 extends substantially perpendicular to the pivot axis 14.

Turning to FIGS. 1, 4 and 5. The branch flow control member 10 has one or more walls 28 which extend over a distance along the pivot axis 14 and which define at least a first channel part 30 and a second channel part 31. The first channel part 30 extends from the bore entry 20 to the inner space 7 and defines a supply channel 8 when the branch flow control member 10 is in the first position 11 or the second position 12. The second channel part 31 extends from the inner space 7 to the bore exit 21 and defines a return channel 9 when the branch flow control member 10 is in the first position 11 or the second position 12.

The branch flow control member 10 that is shown has multiple walls 28 which define the first channel part 30, the second channel part 31, a third channel part 34, and a fourth channel part 35. In the view of FIG. 4, i.e. the direction of the pivot axis 14, the first 30, second 31, third 34 and fourth 35 channel part are located about the pivot axis 14 and in particular form quadrants about the pivot axis 14.

FIG. 4 shows the branch flow control member 10 being positioned in the second position 12. In said second position 12 the first 30 and fourth 35 channel parts are positioned at the bore entry 20 and form the supply channel 8. The second 31 and third 34 channel parts are positioned at the bore exit 21 and form the return channel 9.

The branch flow control member 10 is symmetrical with respect to at least one plane 47 extending along the pivot axis 14, in particular with respect to two planes 47, 48 extending along the pivot axis 14.

FIG. 5 shows the branch flow control member 10 being positioned in the first position 11. The first 30 and third 34 channel parts are positioned at the bore entry 20 and form the supply channel 8 and the second 31 and fourth 35 channel parts are positioned at the bore exit 21 and form the return channel 9.

So the removal device 1 always provides a supply channel 8 and a return channel 9, thereby allowing the liquid to flow through the removal device 1 from the entry 4 to the exit 5.

Due to its symmetry, the branch flow control member 10 can be pivoted either clockwise or counter-clockwise with respect to the pivot axis 14. In FIGS. 4 and 5 the branch flow control member 10 is pivoted clockwise from the first position to the second position. If however the pivoting occurs counter-clockwise, starting from the first position as shown in FIG. 5, the second 31 and third 34 channel parts will form the supply channel 8 in the second position. The first 30 and fourth 35 channel part will then form the return channel 9.

The branch flow control member 10 may have a central body 36 extending over a distance along the pivot axis 14. The main channel part 24 extends through said central body 36. The first 30, second 31, third 34 and fourth 35 channel parts are defined by a first 38, second 39, third 40 and fourth wall 41. Said four walls 38, 39, 40, 41 extend over a radial distance from the central body 36 and extend over a distance along the pivot axis 14. The first 30, second 31, third 34 and fourth 35 channel parts are located around said central body 36. Each of the first, second, third and fourth channel parts has a cross section in the form of a pie-shape or a shape of one quarter of an annulus.

The branch flow control member 10 also comprises the adjustment member 15 which is configured to pivot the branch flow control member 10 between the first position 11 and the second position 12 when operated by a user. The main channel part 24, the first and second channel part 30, 31 are jointly pivoted when the branch flow control member 10 is pivoted about the pivot axis 14.

The branch flow member may be an integral body comprising the abovementioned parts.

In FIGS. 4 and 5 the branch flow control member 10 is positioned inside the cylindrical bore 17. The branch flow control member 10 comprises four separating walls 28 extending radially away from and parallel to the pivot axis 14. The four separating walls 28 define the four quadrants. In the shown embodiments, two of the four separating walls 28 are in fact double walls 39, 41. These double walls however function as one separating wall.

The first channel part 30 and the second channel part 31 extend substantially parallel to the pivot axis 14, and are separated from one another by the separating walls 28.

The branch flow control member 10 is configured to pivot over an angle of 90° between the first position 11 and the second position 12. FIG. 4 shows the branch flow control member 10 being positioned in the second position 12. FIG. 5 shows the first position 11, wherein the main channel part 24 of the branch flow control member 10 is positioned transverse with respect to the main channel 2. In said first position 11, substantially 100% of the incoming main flow 3 is branched off into the inner space 7 via the supply channel 8. Said supply channel 8 is formed by two channel parts 30, 35.

Figure 6A:
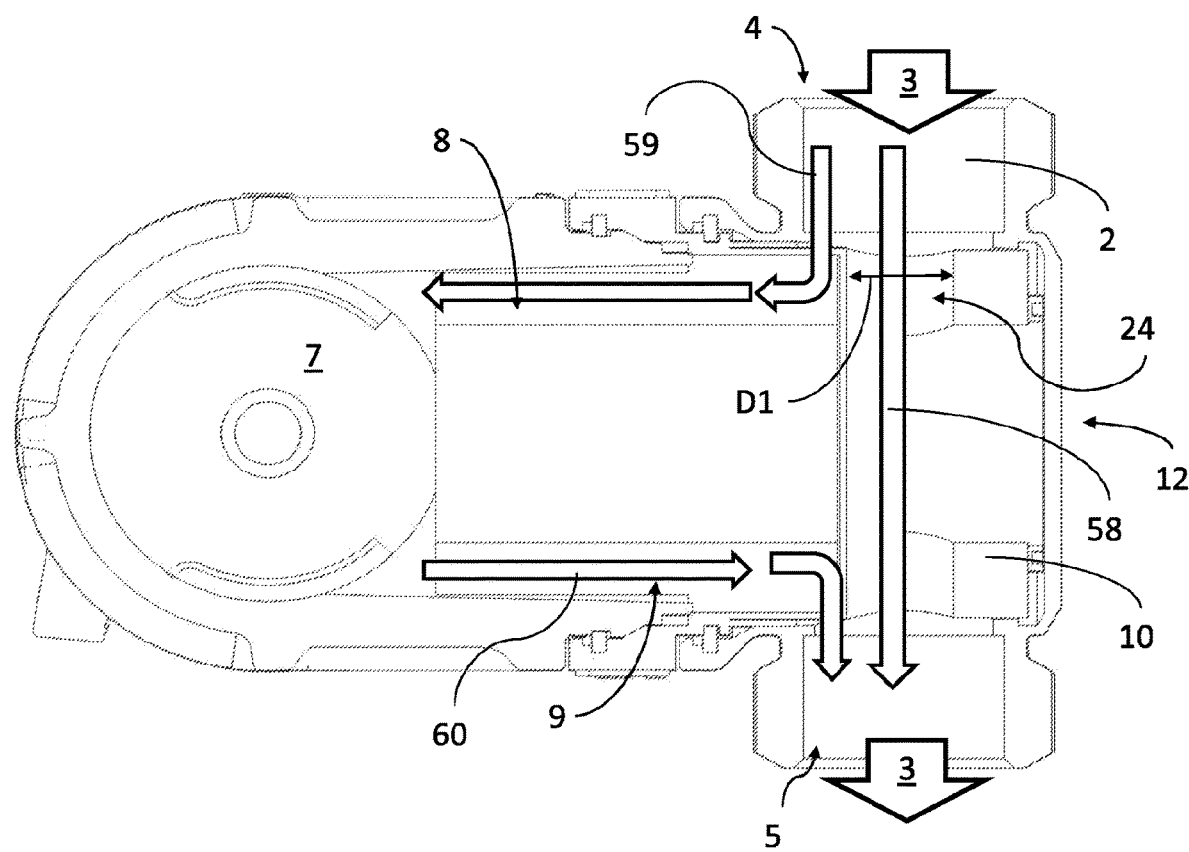
FIG. 6 schematically shows a cross-sectional top view of an embodiment of the removal device according to the first and combined invention, wherein the branch flow control member is in the second position.
Figure 6B:
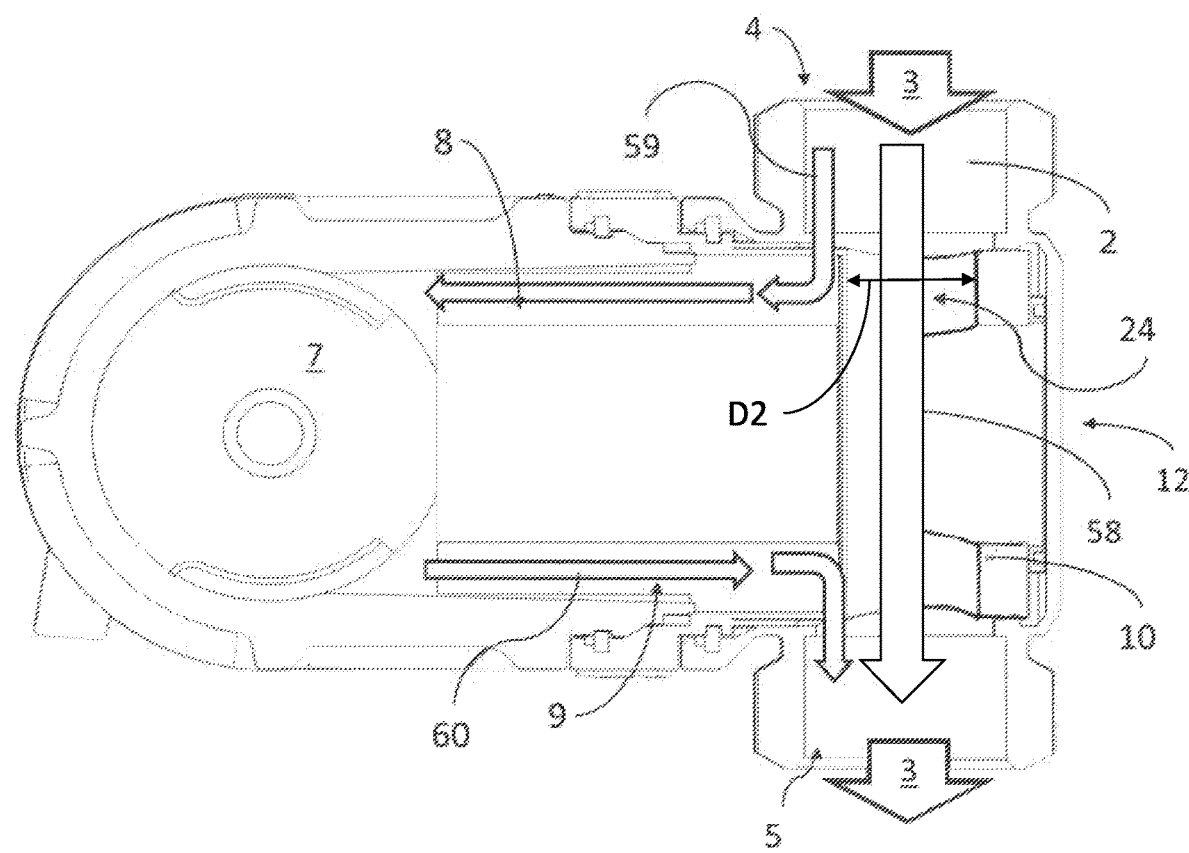
Figure 7:
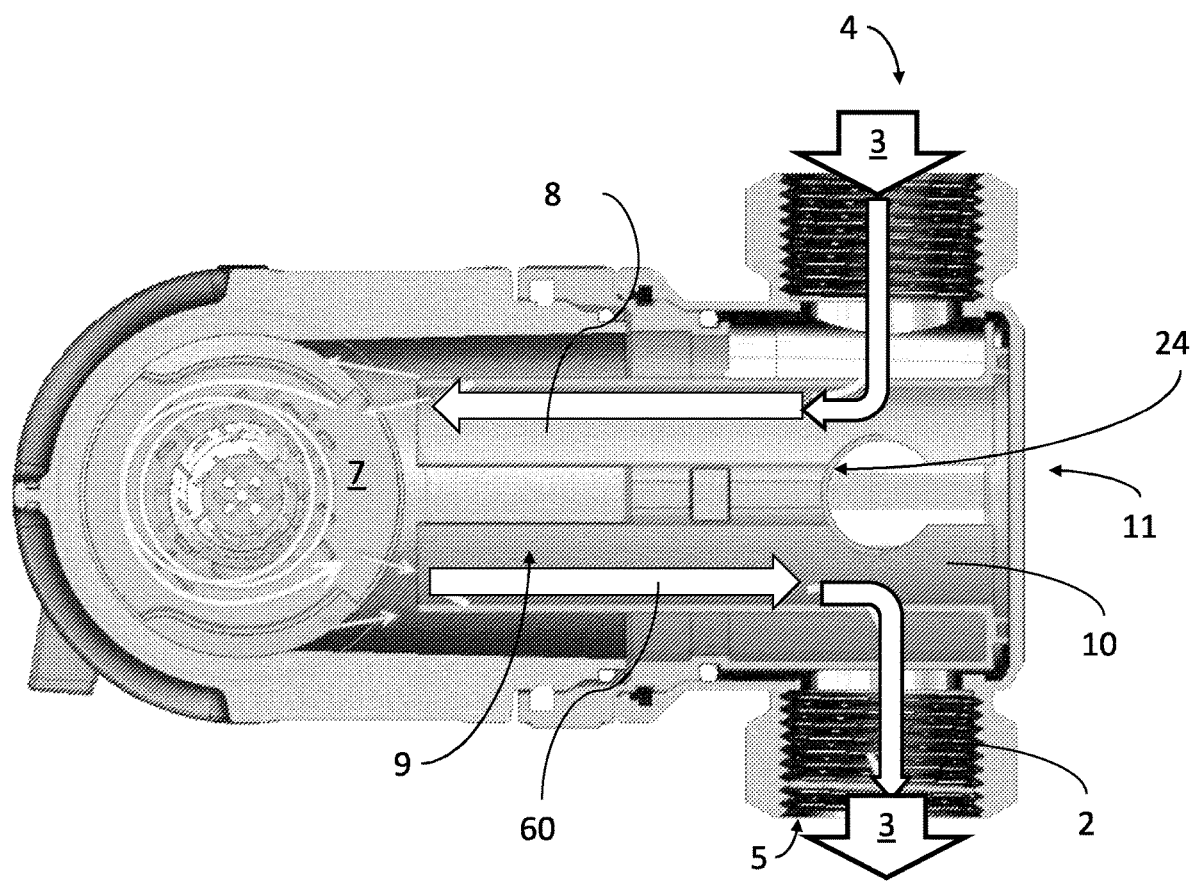
FIG. 7 schematically shows a cross-sectional top view of an embodiment of the removal device according to the first and combined invention, wherein the branch flow control member is in the first position.

FIGS. 6 and 7 illustrate the flow paths through the removal device for respectively the second position 12 (FIG. 6) and first position 11 (FIG. 7). In FIG. 6, a main flow 3 enters the removal device via the entry 4. A part 58 of the main flow 3 flows straight through the main channel part 24 towards the exit 5. A remaining part 59 is branched off and guided towards the inner space 7 via the supply channel 8. A return flow 60 flows back from the inner space towards the exit 5 via the return channel 9, where it merges with the part 58 of the main flow 3.

FIGS. 6A and 6B respectively show a different branch off percentage, wherein the branch flow member in FIG. 6A branches off between 30-70%, and wherein in FIG. 6B the branch flow control member branches off between 10-30%. This is shown by the difference in diameter D1, D2 of the main channel part 24. In FIG. 6A a first diameter D1 is smaller than in FIG. 6B, wherein the main channel part 24 has a second diameter D2. This is also shown by the part 58 of the main flow 3 which flows straight through the main channel part 24 toward the exit 5. In FIG. 6A said part 58 is smaller than the part 58 in FIG. 6B.

FIG. 7 shows the branch flow control member 10 in the first position 11, wherein substantially 100% of the incoming main flow 3 is branched off and guided to the inner space 7. The return flow 60 flows from the inner space 7 back to the main channel 2 via the return channel 9.

Figure 8A:
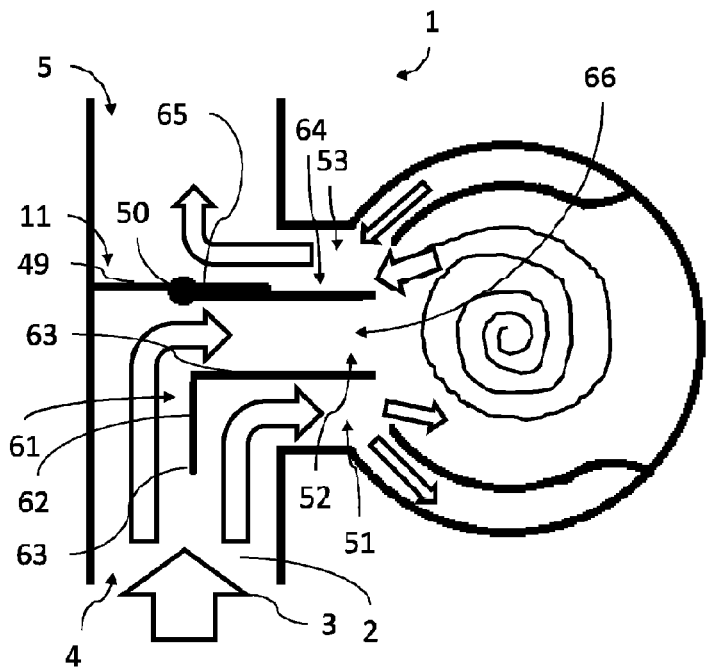
FIGS. 8A and 8B schematically show another embodiment of the removal device according to the first and combined invention.
Figure 8B:
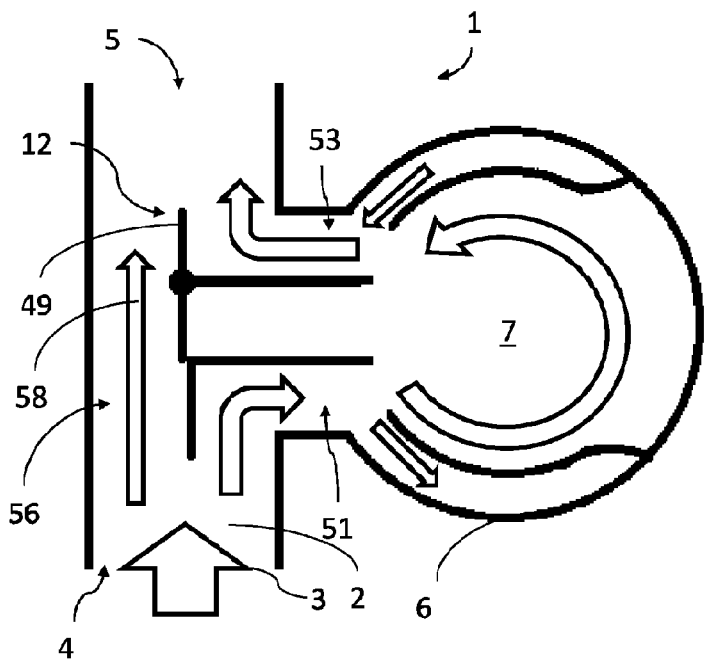

Turning to FIGS. 8A and 8B, a different embodiment of the removal device 1 is shown, wherein the branch flow control member 10 comprises a valve 49 which is positioned in the main channel 2. The valve 49 comprises a pivot axis 50 about which valve 49 is pivotable between the first position 11 (FIG. 8A) and the second position 12 (FIG. 8B). The pivoting is performed by an adjustment member, which is provided outside the main channel (not shown), in particular on an outer surface of the main channel. The pivot axis 50 extends transversely to the main flow direction. In the first position 11, the valve 49 defines at least two supply channels 51, 52 for branching off substantially 100% of the incoming main flow 3, and one return channel 53. In the second position 12, the valve 49 defines a supply channel 51, a return channel 53, and one main channel part 56. The main channel part 56 provides a substantially unobstructed straight flow path for a part 58 of the main flow 3 between the entry 4 and the exit 5.

In said different embodiment, a first wall 61 is located in the main channel 2. The first wall 61 has a first part 62 extends substantially parallel to the main channel 2. A leading edge 63 of the first wall 61 faces the incoming main flow 3, thereby dividing the incoming main flow 3 in a first flow part and a second flow part. The first flow part flows substantially unobstructed past the first wall 61. The second flow part is branched off into the inner space 7 of the removal device 1 via a second part 63 of the first wall 61 which extends from the main channel 2 towards the inner space 7.

A second wall 64 is positioned downstream of the first wall, and extends from the main channel 2 towards the inner space 7. The second wall extends transverse to the direction of the main channel. The valve 49 is positioned at an end 65 of the second wall 64.

The first and second wall 61, 64 divide a housing entry 66 in three channels. A first channel 51 functions as supply channel, a third channel 53 functions as return channel. A second channel 52 may function as a supply channel when the valve 49 is in the first position 11. When the valve 49 is in the second position 12, the second channel 52 does not function as a supply channel nor as a return channel.

The invention further relates to a method of removing gas bubbles and/or dirt particles from a liquid, the method comprising:
  providing a removal device 1 according to the present invention,
  positioning the branch flow control member 10 in the first position 11,
  guiding a flow of liquid through the removal device 1,
  position the branch flow control member 10 in the second position 12,
  guiding a flow of liquid through the removal device 1.

The first invention as described here above is an invention on itself. It may however be combined with a second invention, resulting in a combined invention having synergy. The second invention is described below and is also an invention on itself.

Figure 9:
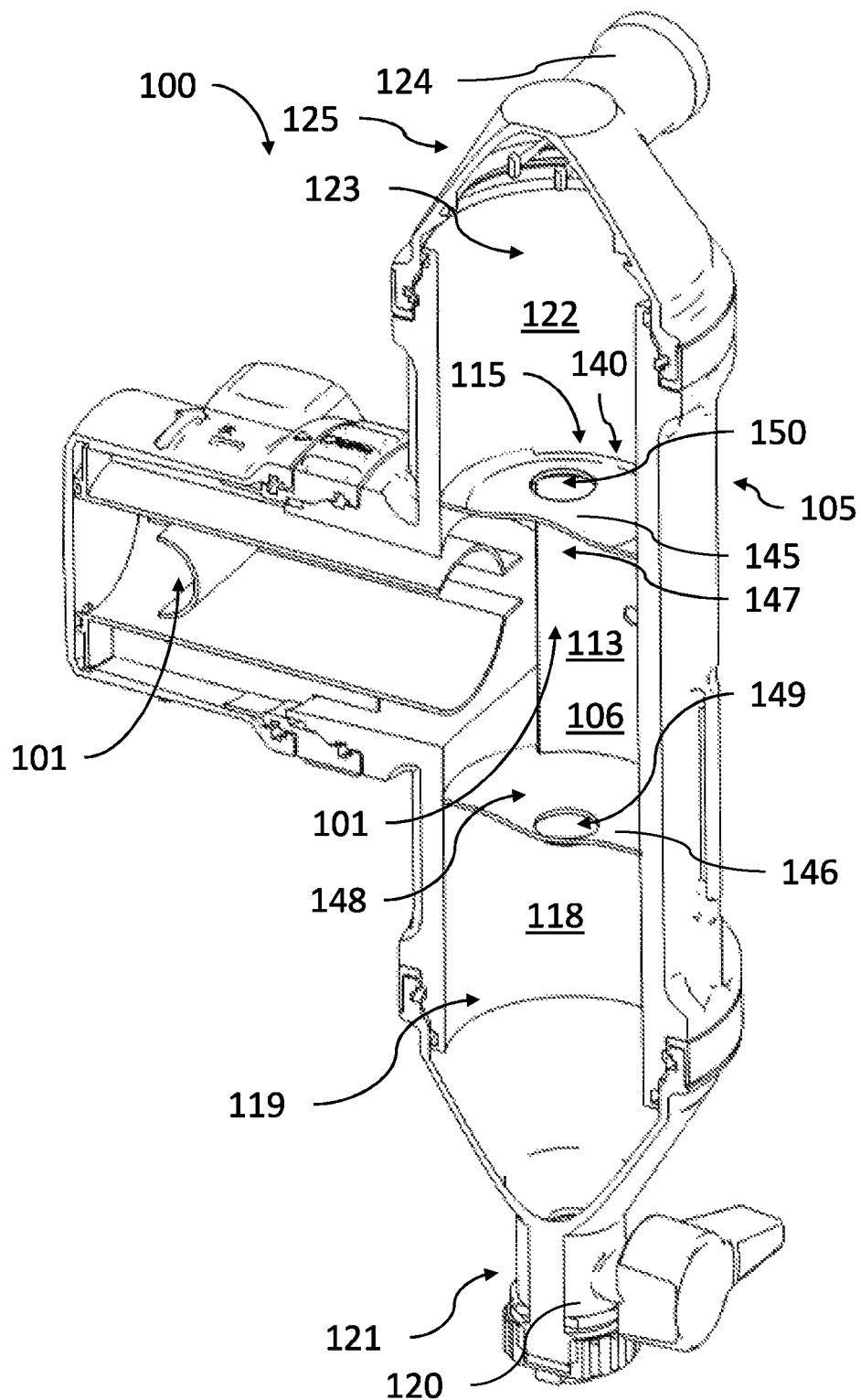
FIG. 9 schematically shows a cross-sectional view of an embodiment of a removal device according to the second and combined invention.
Figure 10:
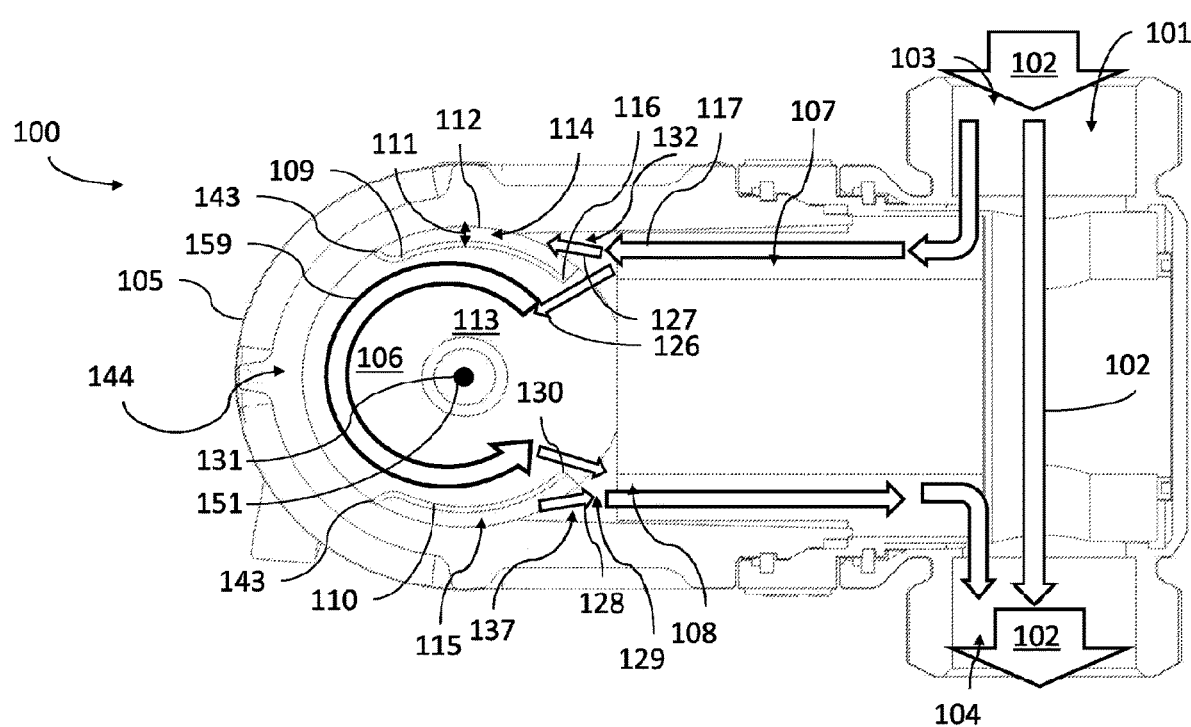
FIG. 10 schematically shows a cross-sectional top view of an embodiment of the removal device of FIG. 9.
Figure 11:
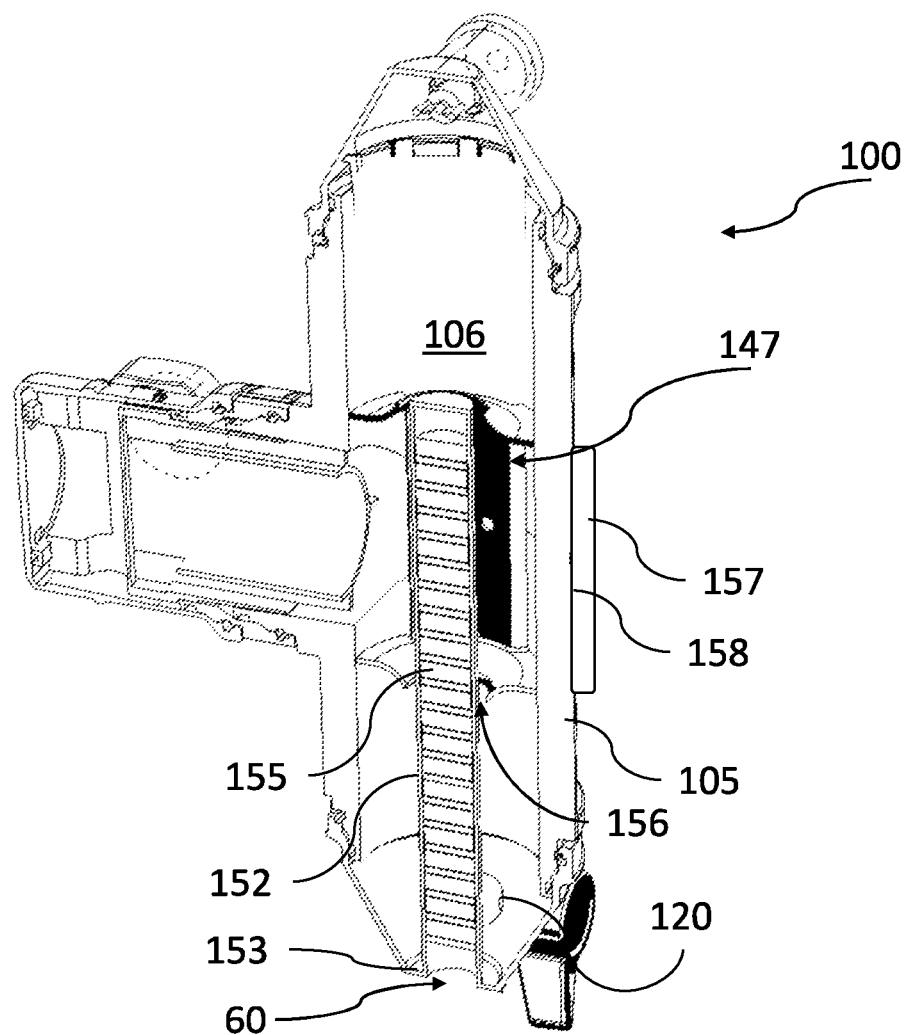
FIG. 11 schematically shows a cross-sectional view of an embodiment of the removal device of FIG. 9.

The second invention is shown in FIGS. 9-11, and also relates to a removal device 100. Said removal device 100 has a main channel 101 for a main flow 102. The main channel 101 has an entry 103 and an exit 104 which are configured to be connected to the conduit system (not shown). The removal device 100 comprises a housing 105 which defines an inner space 106. The housing 105 is arranged adjacent the main channel 101. At least one supply channel 107 extends from the main channel 101 to the inner space 106. A return channel 108 extends from the inner space 106 back to the main channel 101.

The removal device 100 comprises a first curved wall 109 and a second curved wall 110. Said walls are provided in the inner space 106 and located at a distance 111 from the housing wall 112. The first curved wall 109 and the second curved wall 110 define a central zone 113 between them. The central zone 113 has a substantially cylindrical shape.

A settling zone entry channel 114 is defined between the first curved wall 109 and the housing wall 112. A settling zone return channel 115 is defined between the second curved wall 110 and the housing wall 112. The first curved wall 109 has a leading edge 116 which is directed against the incoming supply flow 117 which enters the inner space 106 via the supply channel 107.

The removal device 100 further comprises a lower settling zone 118 located in a lower region 119 of the inner space 106. In use the liquid has a substantially smaller flow velocity in the lower settling zone 118 than in the main channel 101. That is because the lower settling zone 118 is configured for settling of dirt particles. The removal device 100 comprises a dirt discharge exit 120 for discharging the settled dirt particles. Said dirt discharge exit 120 is located at a lower end 121 of the housing 105.

The removal device 100 has an upper rising zone 122 located in an upper region 123 of the inner space 106. Although the shown embodiment has both an upper rising zone 122 and a lower settling zone 118, it may also be possible to have just one of these zones. In use the liquid has a substantially smaller flow velocity in the upper rising zone 122 than in the main channel 101. The upper rising zone 122 is configured to allow rising of gas bubbles. In order to discharge the risen gas bubbles, the removal device 100 comprises a gas discharge exit 124. The gas discharge exit 124 is located at an upper end 125 of the housing 105.

The leading edge 116 of the first curved wall 109 is configured to divide the incoming supply flow 117 in a central flow 126 and a settling zone entry flow 127. The central flow 126 flows into the central zone 113. The settling zone entry flow 127 flows into and through the settling zone entry channel 114 and from the settling zone entry channel 114 into the lower settling zone 118 and/or upper rising zone 122.

The settling zone return channel 115 is configured to guide a settling zone return flow 128 from the lower and/or upper rising zone 122 toward the return channel 108. A merge location 129 is defined between a trailing edge 130 of the second curved wall 110 and the return channel. At this merge location 129 the central flow 126 from the central zone 113 merges with the settling zone return flow 128. From said merge location 129 the merged flow flows towards and into the return channel 108.

When a flow velocity of the central flow 126 into the inner space 106 exceeds a threshold value, then the central zone 113 acts as a central centrifugal zone for removing dirt particles and gas bubbles on the basis of centrifugal action. In this case, a vortex will be induced in the central zone 113 by the incoming central flow 126. This is shown in FIG. 7. The curved walls 109, 110 facilitate the forming of the vortex. When the flow velocity of the central flow 126 is below said threshold value, the central zone 113 is configured to act as a central settling zone for dirt particles and gas bubbles. The resulting flow is in the latter case illustrated by arrow 159 in FIG. 10.

The threshold value is 0.6 m/s.

Turning to FIG. 10, a cross-section of the removal device 100 is shown, in particular in top view. The first and second curved walls 109, 110 are positioned mirrored relative to a central axis 131 of the inner space 106.

The settling zone entry channel 114 comprises a settling zone entry channel entrance 132 being defined between the leading edge 116 of the first curved wall 109 and the housing wall 112. A bottom exit opening (not shown) opens into the lower settling zone 118 (FIG. 9), the bottom exit opening being defined between a lower end 134 of the first curved wall 109 and the housing wall 112. An upper exit opening (not shown) opens into the upper rising zone 122 (FIG. 9), the upper exit opening being defined between an upper end 136 of the first curved wall 109 and the housing wall 112.

The settling zone return channel 115 comprises a settling zone return channel exit 137 being defined between the trailing edge 130 of the second curved wall 110 and the housing wall 112. A bottom entrance opening (not shown) provides an entrance from the lower settling zone 118 into the settling zone return channel 115. The bottom entrance opening 140 is defined between a lower end 139 of the second curved wall 110 and the housing wall 112. An upper entrance opening 140 (FIG. 9) provides an entrance from the upper rising zone 122 into the settling zone return channel 115. The upper entrance opening 140 is defined between an upper end 142 of the second curved wall 110 and the housing wall 112.

The first and second curved walls 109, 110 have an edge 143 at a side 144 thereof which is located away from the supply channel 107 and return channel 108. Said edge 143 is in contact with the housing wall 112 and closes the settling zone entry channel 114 and the settling zone return channel 115 at the edge 143.

The first and second curved walls 109, 110 extend substantially parallel to the housing wall 112. The curved walls 109, 110 particularly extend vertically.

The removal device 100 further comprises an inner top wall 145 and an inner bottom wall 146. The inner top wall 145 extends between the upper ends 136, 142 of the first and second curved walls 109, 110. The inner bottom wall 146 extends between the lower ends 134, 139 of the first and second curved walls 109, 110. The inner top wall 145 and the inner bottom wall 146 define an upper end 147 respectively a lower end 148 of the central zone 113.

The inner bottom wall 146 comprises a bottom through hole 149 for dirt particles to pass to the lower settling zone 118 located below the central zone 113. The inner bottom wall 146 is in particular inclined in order to guide dirt particles toward the bottom through hole 149.

The inner top wall 145 comprises a top through hole 150 for gas bubbles to pass to the upper rising zone 122 located above the central zone 113. The inner top wall 145 is in particular inclined in order to guide gas bubbles toward the top through hole 150.

The through holes are provided in a center 151 of the inner bottom wall 146 and/or inner top wall 145.

FIG. 11 shows the removal device 100 comprising a hollow member 152 provided in the inner space 106. The hollow member 152 extends from a bottom portion 153 of the housing 6 into the inner space 106, in particular to an upper end 147 of the central zone 113. An interior magnet 155 is provided inside the hollow member 152. The interior magnet 155 is configured to attract magnetite particles which enter the central zone 113 and/or the lower settling zone 118 via the settling zone entry channel 114. The interior magnet 155 is removable from the hollow member 152 via opening 60. In order to remove the interior magnet 155, the housing 105 may be opened at the bottom portion 153. After removing the interior magnet 155, magnetite particles attached to the hollow member 152 will settle towards the bottom of the inner space 106. The dirt discharge 120 allows the magnetite particles to be discharged.

The hollow member 152 extends through the bottom through hole 149. A cross-sectional area of the hollow member 152 is smaller than a cross-sectional area of the bottom through hole 149. This allows dirt particles to pass through the gap, as a gap 156 is defined between the hollow member 152 and the bottom through hole 149.

Instead of, or together with the interior magnet 155, an exterior magnet 157 may be provided. The exterior magnet 157 is provided an outer surface 158 of the housing 6, in particular at a location opposite to the supply channel 107 and return channel 108.

The interior magnet 155 and/or exterior magnet 157 can also be provided in the first invention, as shown in FIG. 3.

The magnets 155, 157 in combination with the different positions 11, 12 of the branch flow control member 10 provide a high flexibility of the removal device. When the branch flow member is in the first position 11 a larger part of the incoming main flow is branched off into the inner space. Said larger part of the incoming main flow flows with a higher flow velocity into the inner space than the part that is branched off into the inner space when the branch flow control member 10 is in the second position. Branching off a large part has as advantage that also a large part of the magnetite particles in the fluid will be separated.

In addition, due to the higher flow velocity a vortex may be formed inside the substantially circular inner space 7, when seen in top view as shown in FIG. 7. The vortex can also be formed without the curved walls 109, 110. An advantage of the vortex is that the magnetite particles in the fluid may pass the magnet 155, 157 multiple times, which increases the probability for said magnetite particles to attach to the magnet 155, 157.

When the branch flow control member 10 is in the second position 12, a smaller part of the incoming main flow is branched off into the inner space 7 compared to the first position 11. The flow velocity of the part that is branched off into the inner space will thus be lower. This results in less to no vortices forming in the inner space. The amount of magnetite particles being removed in the second position will therefore be lower compared to the first position. An advantage of the second position 12 however is that due to the lower velocity inside the inner space 7 dirt particles are better capable of settling, and gas bubbles better capable of rising.

By adjusting the branch flow control member 10 between the first position 11 and the second position 12, the user is thus able to choose between a magnetite separation mode (first position) in which the ratio of magnetite particles to dirt particles is relatively high and a dirt separation mode (second position) in which said ratio of magnetite particles to dirt particles is relatively low, i.e. lower than said ratio in the first position.

The second invention further relates to a method of removing gas bubbles and/or dirt particles from a liquid in a liquid conduit system, the method comprising:
  providing a removal device 100 according to the present invention,
  guiding a supply flow 117 through the supply channel 107 into the inner space 106,
  dividing the supply flow 117 into a central flow 126 and a settling zone entry flow 127 with the leading edge 116 of the first curved plate,
  guiding the settling zone entry flow 127 into the lower settling zone 118 and/or the upper rising zone 122, and allowing dirt particles to settle in the lower setting zone and/or gas bubbles to rise in the upper rising zone 122, and
  allowing dirt particles to settle and gas bubbles to rise in the central zone 113.

As stated, the embodiments of the removal devices 1, 100 according to both the first and second invention may be combined, thereby complementing each other.

In said combined embodiments, a branch flow control member 10 is provided, together with the curved walls. The inner top wall 145 and inner bottom wall 146 may also be provided. When the branch flow control member 10 is in the first position 11, a flow velocity of the supply flow into the inner space 106 is higher than a flow velocity of the supply flow into the inner space 106, in particular higher than the threshold value, when the branch flow control member 10 is in the second position 12. As the flow velocity of the supply flow, or central flow 126, into the central flow 126 is above the threshold value when the branch flow control member is in the first position 11 the central zone 113 acts as a centrifugal zone. When the branch flow control member is in the second position 12 the central zone 113 acts as a settling zone, because the supply flow, or central flow 126, will be below the threshold value.

This way, the removal device 100 benefits from the high flow velocity of the supply flow when the branch flow control member 10 is in the first position 11 by inducing the vortex. The vortex will force larger dirt particles to the outside of the vortex and larger gas bubbles to its center, or eye. This way, a higher amount of larger dirt particles and gas bubbles can be removed. Especially right after installation of the removal device 100 this mode is advantageous.

The combined invention also relates to a method for removing gas bubbles and/or dirt particles from a liquid in a liquid conduit system, the method comprising:
  positioning the branch flow control member 10 in the first position 11, wherein dirt particles and/or gas bubbles are separated from the central flow 126 in the central zone 113 on the basis of centrifugal action, and
  positioning the branch flow control member 10 in the second position 12, wherein dirt particles and/or gas bubbles are separated from the central flow 126 in the central zone 113 on the basis of settling.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting, but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language, not excluding other elements or steps). Any reference signs in the claims should not be construed as limiting the scope of the claims or the invention.

It will be apparent to those skilled in the art that various modifications can be made to the system and method according to the invention without departing from the scope as defined in the claims.

The invention claimed is:

1. A removal device for removing gas bubbles and/or dirt particles from a liquid in a liquid conduit system, the removal device comprising:

a main channel for a main flow, the main channel having an entry and an exit which are configured to be connected to the conduit system, a housing which defines an inner space, wherein the housing is arranged adjacent the main channel, at least one supply channel extending from the main channel to the inner space, at least one return channel extending from the inner space back to the main channel, and a branch flow control member positioned in the main channel, the branch flow control member being movable between a first position in which the branch flow control member is constructed to define a first path configured to branch off at least a part of the incoming main flow into the inner space via the supply channel, and a second position, in which the branch flow control member is constructed to define a second path configured to allow a part of the incoming main flow to flow from the entry to the exit without being branched off into the inner space and to branch off at least a part of the incoming main flow into the inner space via the supply channel, wherein in the first position the branch flow control member is constructed to branch off a larger part of the incoming main flow into the inner space via the supply channel than in the second position.

2. The removal device according to claim 1, wherein the branch flow control member is configured to gradually decrease the part of the incoming main flow which is branched off when the branch flow control member moves from the first position to the second position, and to gradually increase the part of the incoming main flow which is branched off when the branch flow control member moves from the second position to the first position.

3. The removal device according to claim 1, wherein in the first position the branch flow control member is constructed to branch off substantially 100% of the incoming main flow into the inner space.

4. The removal device according to claim 1, wherein in the second position the branch flow control member is constructed to branch off 10-30% of the incoming main flow into the inner space.

5. The removal device according to claim 1, wherein in the second position, or alternatively a third position, the branch flow control member is constructed to branch off 30-70% of the incoming flow into the inner space of the incoming main flow into the inner space.

6. The removal device according to claim 1, wherein the branch flow control member comprises the supply channel and the return channel.

7. The removal device according to claim 1, wherein the main channel is straight, and wherein in the second position the branch flow control member is constructed to allow a part of the incoming main flow to flow straight through the main channel without being branched off.

8. The removal device according to claim 1, wherein the branch flow control member is pivotable about a pivot axis.

9. The removal device according to claim 1, wherein the branch flow control member is movable between the first position and the second position via an adjustment member which is manually operable.

10. The removal device according to claim 9, wherein the housing is connected to the main channel via a pivotable coupling, the pivotable coupling comprising the adjustment member.

11. The removal device according to claim 8, comprising a cylindrical bore defined by a bore wall, the cylindrical bore having a first central axis extending substantially perpendicular to the direction of the main channel and extending towards the inner space, the cylindrical bore having a bore entry where the main flow enters the bore and a bore exit where the main flow exits the bore, the cylindrical bore having a first length and a first inner diameter, wherein the branch flow control member is positioned inside the bore and is pivotable about the pivot axis, the pivot axis being coaxial with the first central axis of the cylindrical bore.

12. The removal device according to claim 11, wherein the branch flow control member comprises a pivotable main channel part defined by a main channel wall, the main channel part being configured to provide a straight flow path for an ongoing part of the main flow between the entry and the exit when the branch flow control member is in the second position, wherein the main channel part extends substantially perpendicular to the pivot axis.

13. The removal device according to claim 12, wherein the main channel part, a first channel part, and a second channel part are jointly pivoted when the branch flow control member is pivoted about the pivot axis.

14. The removal device according to claim 11, wherein the branch flow member comprises one or more walls which extend over a distance along the pivot axis and which define:
a first channel part,
a second channel part,
a third channel part, and
a fourth channel part,
wherein when viewed in the direction of the pivot axis, the first, second, third and fourth channel part are located about the pivot axis and in particular form quadrants about the pivot axis, and
wherein in the first position of the branch flow control member the first and third channel parts are positioned at the bore entry and form the supply channel and the second and fourth channel parts are positioned at the bore exit and form the return channel, and wherein in the second position of the branch flow control member the first and fourth channel parts are positioned at the bore entry and form the supply channel and the second and third channel parts are positioned at the bore exit and form the return channel.

15. The removal device according to claim 14, wherein the branch flow control member comprises a central body extending over a distance along the pivot axis, wherein the main channel part extends through said central body, wherein the first, second, third and fourth channel parts are defined by a first, second, third and fourth wall which extend over a radial distance from the central body and extend over a distance along the pivot axis, wherein the first, second, third and fourth channel parts are located around said central body, wherein in particular each of the first, second, third and fourth channel parts having a cross section in the form of a pie-shape or a shape of one quarter of an annulus.

16. The removal device according to claim 9, wherein the branch flow control member comprises a valve which is positioned in the main channel, wherein the valve comprises a pivot axis about which the valve is pivotable between the first position and the second position by the adjustment member, the pivot axis extending perpendicular to the main flow direction, wherein in the first position, the valve defines at least two supply channels for branching off substantially 100% of the incoming main flow, and one return channel, and wherein in the second position, the valve defines a supply channel, a return channel, and one main channel part, the main channel part being configured to provide a substantially unobstructed straight flow path for a part of the main flow between the entry and the exit.

17. Removal device according to claim 1, wherein an exterior magnet is provided on an outer surface of the housing at a location opposite to the supply channel and return channel.

18. Removal device according to claim 1, wherein a hollow member is provided in the inner space, the hollow member extending from a bottom portion of the housing into the inner space to above the supply channel, wherein an interior magnet is provided inside the hollow member, the interior magnet being removable from the hollow member via an opening.

\* \* \* \* \*